United States Patent
Rupp et al.

(10) Patent No.: US 6,578,550 B1
(45) Date of Patent: Jun. 17, 2003

(54) DEVICE FOR DETECTING THE REVERSE ROTATION OF A ROTATING PART OF AN INTERNAL COMBUSTION ENGINE

(75) Inventors: Ingolf Rupp, Ludwigsburg (DE); Michael Lehner, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 09/786,538

(22) PCT Filed: Jul. 12, 2000

(86) PCT No.: PCT/DE00/02268

§ 371 (c)(1),
(2), (4) Date: Mar. 5, 2001

(87) PCT Pub. No.: WO01/06264

PCT Pub. Date: Jan. 25, 2001

(30) Foreign Application Priority Data

Jul. 20, 1999 (DE) .......................................... 199 33 845

(51) Int. Cl.[7] .................................................. F02P 5/00
(52) U.S. Cl. .................................. 123/406.13; 123/631
(58) Field of Search ............................ 123/406.13, 631, 123/198 DB, 198 DC; 701/112

(56) References Cited

U.S. PATENT DOCUMENTS

| | | | | |
|---|---|---|---|---|
| 4,267,569 A | * | 5/1981 | Baumann et al. ....... | 123/406.13 |
| 4,787,355 A | * | 11/1988 | Maeda .................... | 123/406.13 |
| 5,131,367 A | * | 7/1992 | Aoki et al. ............. | 123/406.62 |
| 5,460,134 A | * | 10/1995 | Ott et al. ................ | 123/406.62 |
| 5,622,153 A | * | 4/1997 | Ott et al. ................ | 123/179.16 |
| 6,016,789 A | * | 1/2000 | Denz et al. ............. | 123/406.62 |

FOREIGN PATENT DOCUMENTS

| | | |
|---|---|---|
| DE | 42 32 864 A | 3/1994 |
| DE | 197 22 016 A | 12/1998 |
| DE | 197 22 016 A1 | 12/1998 |
| DE | 197 50 304 A | 5/1999 |
| EP | 0 017 933 B1 | 8/1986 |
| GB | 2 096 312 A | 10/1982 |
| GB | 2 132 750 A | 7/1984 |

* cited by examiner

*Primary Examiner*—John Kwon
(74) *Attorney, Agent, or Firm*—Michael J. Striker

(57) ABSTRACT

The invention relates to a device for detecting the reverse rotation of a rotating part of an internal combustion engine, having a crankshaft (3) whose rotation, by means of a sensor (6) and a detector disk (2) which is connected to the crankshaft (3) and has a reference mark (5) and a multitude of similar angle marks (4), are sent by the sensor (6) to a control unit (1) in the form of pulses, having a camshaft (7) whose rotation is detected by means of an absolute angle detector (8), wherein the output signal of the absolute angle detector (8) steadily rises or falls within a period depending on the rotation direction of the camshaft 7. The output signal of the absolute angle detector (8) is supplied to the control unit (1) for processing. In order to detect reverse rotation of the internal combustion engine, three successive angle values $\phi(k-2)$, $\phi(k-1)$, $\phi(k)$, are scanned from the output signal of the absolute angle detector (8) and are compared to one another in an algorithm in such a way that in the event of a malfunction with reverse rotation, the equation: $\phi(k)<\phi(k-1)<\phi(k-2)$ is true. If this condition is not fulfilled, no conclusion is drawn regarding reverse rotation.

7 Claims, 2 Drawing Sheets

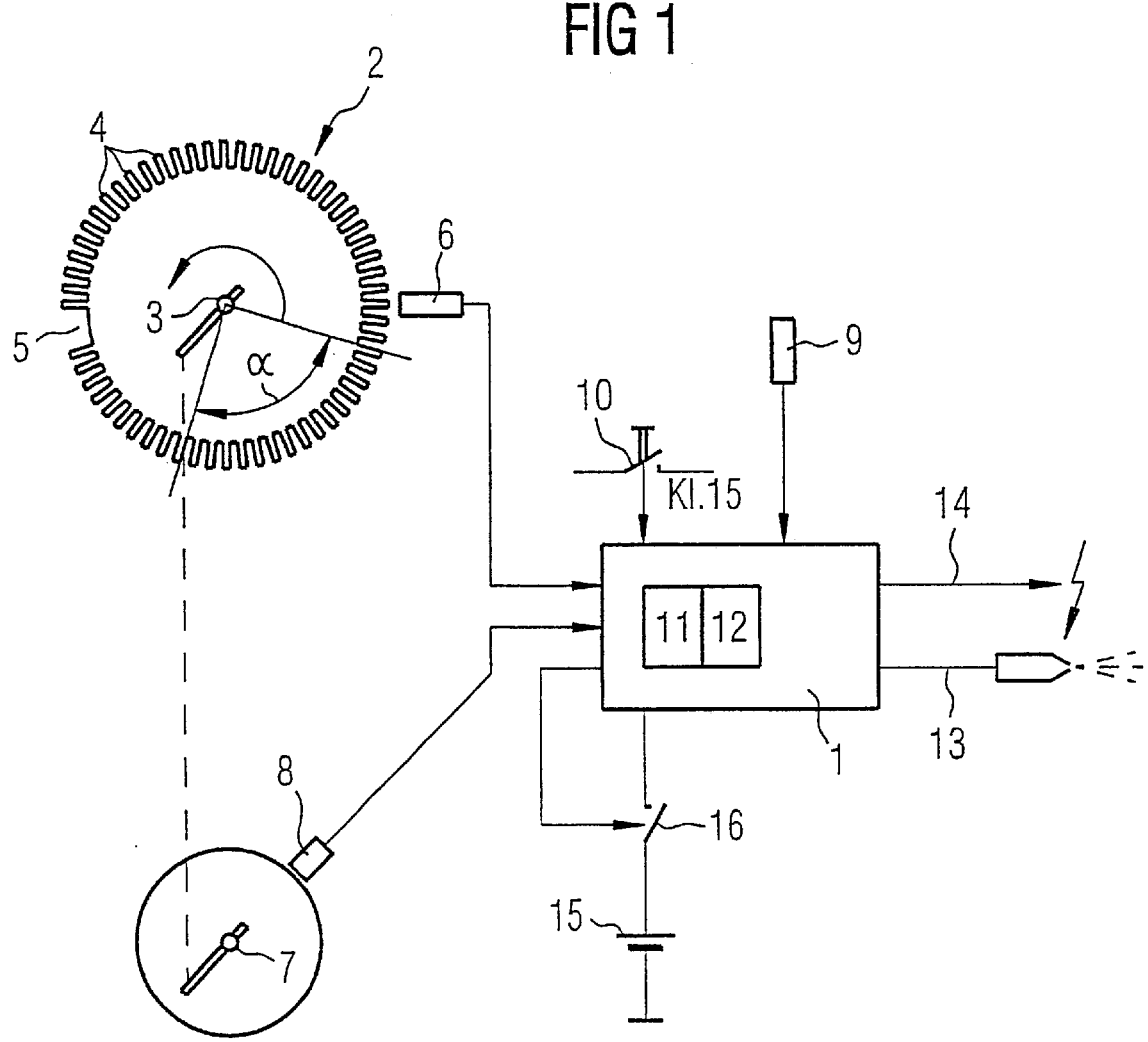

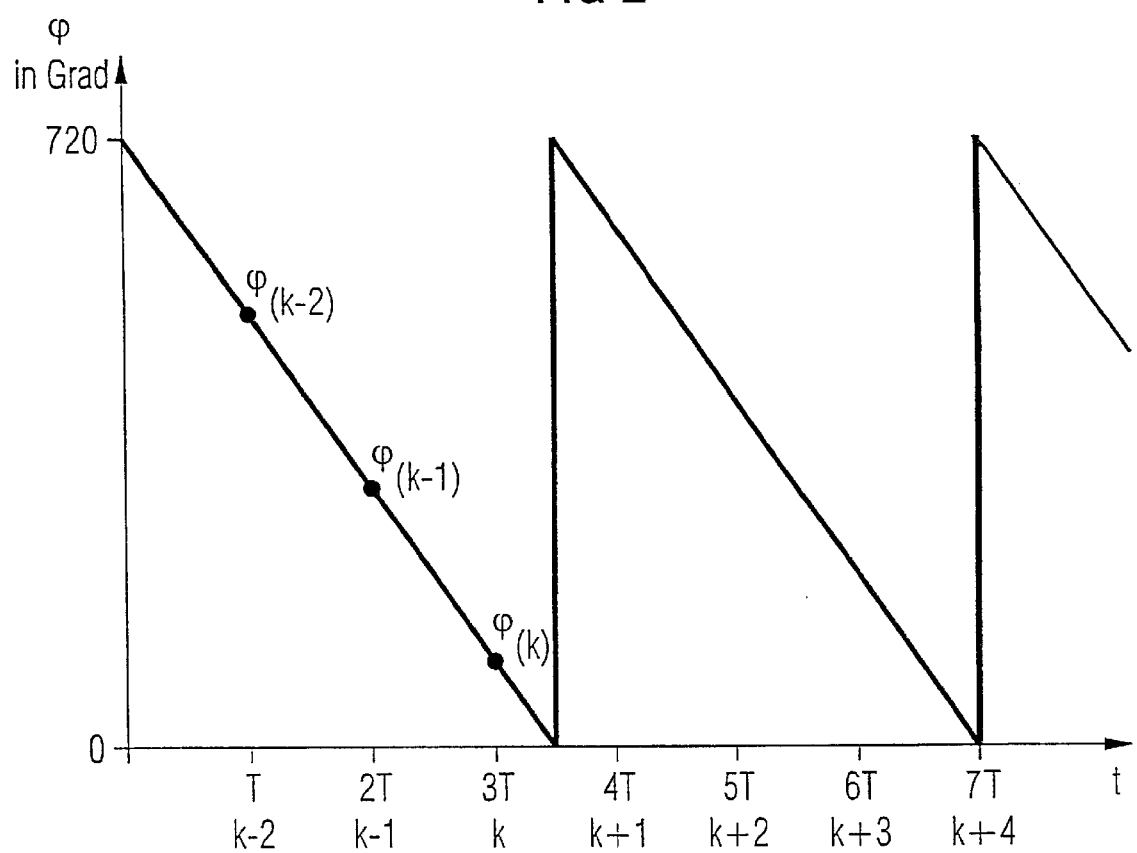

DEVICE FOR DETECTING THE REVERSE ROTATION OF A ROTATING PART OF AN INTERNAL COMBUSTION ENGINE

The invention relates to a device for detecting the reverse rotation of a rotating part of an internal combustion engine as generically defined by the preamble to the main claim.

In multi-cylinder internal combustion engines with electronically regulated injection and ignition, a calculation is executed in the control unit as to when and how much fuel is to be injected into which cylinder and when ignition should occur. In order for these calculations to be executed correctly, the respective positions of the crankshaft and camshaft of the engine must be known.

EP 0 017 933, for example, describes the fact that the crankshaft and camshaft are each connected to a disk whose surface has at least one reference mark on it in the form of a gap and also has a multitude of similar markings, also called increments, on it. These two rotating disks are scanned by suitable stationary sensors. Based on the chronological sequence of impulses supplied by the sensors, the control unit can obtain definite evidence as to the position of the crankshaft and camshaft so that corresponding control signals for the injection or ignition can be produced in the control unit. In order to assure that the position of the crankshaft and the camshaft is correct, a synchronization must be executed after the engine is started. This is carried out based on the detection of the reference marks. The speed and angular position of the crankshaft and camshaft must be determined in a highly precise manner.

Based on the fact that in one work cycle of a four-stroke engine, the camshaft executes a 360° KW, the crankshaft executes a 720° KW during the same interval, and the positions of both shafts can be detected by means of reference marks, a determination can be made as to which work cycle the engine is currently in. In order to determine the speed of a crankshaft, a detector disk with 60-2 teeth is usually used, which is scanned by a sensor inductively, magnetoresistively, or by means of the Hall effect.

In order to assure a reliable operation of the internal combustion engine, the engine must be prevented from rotating in reverse, or a reverse rotation must be reliably detected. A reverse rotation of the engine can occur, for example, due to an output of incorrect ignition angle data when starting, when the engine stalls, or as a result of inertia forces when the vehicle is in a skid.

In the event of the reverse rotation, the control unit also receives a square-wave signal from the speed sensor, but cannot determine from it whether there is in fact a reverse rotation. If a reverse rotation of the engine goes undetected, then the angular basis in the control unit no longer agrees with the motor position or an incorrect synchronization can occur. This would result in indefinite injections and ignitions. This uncontrolled state of the engine involves a high risk of ignitions when the injection valve is open and therefore a high risk of intake manifold splashing.

In the event of intake manifold splashing, the idle actuator, the throttle valve, or the intake manifold, and possibly also the pressure gauge and the hot film air mass gauge (HFM) can be damaged.

For systems with gasoline direct injection, a reverse rotation detection is particularly important since the charging of fuel into the cylinder is no longer executed as a function of a mechanical coupling, but is executed as a function of the angular basis in the control unit. Consequently, not only the ignition, but also the injection into the combustion chamber can occur at any time. If the injection valve is actuated during starting when the cylinder is already under compression, then it may not be possible to close it again since the counterpressure is too high (high pressure has not yet built up in the rail). As a result, air can get into the high-pressure fuel distribution apparatus and the valve can coke.

In order to obtain sufficient information regarding the current work cycle of the engine, in addition to querying the crankshaft position, the absolute camshaft position must also be detected. The position of the camshaft must also be detected for systems with camshaft adjustment.

In modern systems for controlling the internal combustion engine, the cam shaft position is determined sequentially. Future systems will require continuous camshaft position detection by means of an absolute angle detector.

There are known absolute angle measuring devices for detecting the camshaft position, whose output signal periodically rises or falls a linear fashion depending on the rotation direction of the camshaft, wherein the period corresponds to 360° of camshaft rotation or 720° of crankshaft rotation. Because the output signal of the camshaft absolute angle measuring device rises or falls in a linear fashion, a matching rotation angle can be associated with, given, or measured for each rotation position of the camshaft.

DE 19722016 has disclosed a device for contactless rotation angle detection, particularly the rotation angle position of the camshaft. In this connection, for example two sensor elements, one of which functions according to the Hall principle and the other of which is a magnetoresistive sensor, are coupled to each other geometrically and are electronically connected via a network, and are subjected to a rotating magnetic field whose rotation correlates to the rotation of the camshaft of the engine. An angle measuring device is thus produced that expresses the rotation angle of a rotating shaft such as the camshaft in the form of a linearly increasing output voltage with a periodic saw tooth when the crankshaft or camshaft rotates in the forward direction, in order for this output to be further processed.

The object of the current invention is to reliably detect, within a small rotation angle, a reverse rotation of the internal combustion engine by means of an absolute angle detector disposed on the camshaft.

This object is attained according to the invention by means of the characterizing part of the main claim.

By querying the absolute angle at particular times, a determination can be advantageously made as to whether the signal is behaving in a monotonously falling manner in order to draw conclusions from this as to whether reverse rotations are occurring. Through the type of reverse rotation detection, it is now possible to suspend the injection output and ignition output. As a result, an operation that is damaging to the engine can be prevented.

Other advantageous embodiments of the invention ensue from the dependent claims.

An exemplary embodiment of the invention is depicted in the drawings.

FIG. 1 is a schematic depiction of a control device for an internal combustion engine, FIG. 2 depicts the output signal of the absolute angle detector.

The control unit 1 according to FIG. 1 is used for control and regulation of internal combustion engines, particularly with gasoline direct injection. The reference numeral 2 indicates a detector disk which is rigidly connected to the crankshaft 3 of the internal combustion engine and on its circumference, has a multitude of similar angle marks. In addition to these similar angle marks 4, there is a reference mark 5 which is produced, for example, by means of two missing angle marks. The detector disk 2 is scanned by the sensor 6, for example an inductive sensor, a Hall sensor, or a magnetoresistive sensor. The signals produced in the sensor 6 when the angle marks 4 travel past it are suitably processed in the control unit 1. The reference numeral 7 indicates the camshaft whose rotation angle is detected by the absolute angle detector 8 and this output signal is supplied to the control unit 1.

By means of other inputs, the control unit 1 receives input variables required for the control and regulation of the internal combustion engine, which are measured by the various sensors. In FIG. 1, these sensors are indicated by the reference numeral 9. By means of another input, an "ignition on" signal is supplied by the terminal 15 of the ignition lock when the ignition switch 10 is closed and the control unit 1 is notified that the internal combustion engine has been started. The control unit 1 contains at least one central processor unit 11 with an arithmetic-logic unit as well as a memory 12 and register and/or shift register.

Signals for the injection and ignition are determined in the control unit 1 for components of the internal combustion engine that are not depicted in detail. These signals are emitted via the outputs 13, 14 of the control unit 1.

The supply of voltage to the control unit 1 takes place in the usual way with the aid of the battery 15, which communicates with the control unit 1 via the switch 16 during the operation of the internal combustion engine and during an after-running phase of the engine, which phase is controlled by the control unit 1 itself. The information still ascertained after the engine is switched off is stored in memory during the after-running phase. This information includes in particular the last angular positions of the crankshaft and the camshaft 3, 7, as well as information regarding the last phase position.

FIG. 2 depicts the signal of the absolute angle detector 8, which is a constant signal in the evaluation function introduced above, plotted over one work cycle (720° KW) or also over one crankshaft rotation (360° KW). At particular time intervals, the absolute angle value of the detector is stored in a shift register in the control unit 1. Three successive values, therefore, yield the following sequence: $\phi(k-2)$, $\phi(k-1)$, $\phi(k)$.

The shift register must thereby have a depth of at least three values. With each input, the values in the shift register are compared with one another. This takes place according to the invention according to the following algorithm: $\phi(k)<\phi(k-1)<\phi(k-2)$. The fulfillment of this condition indicates that a reverse rotation is occurring. If this condition is not fulfilled, no conclusion is drawn regarding a reverse rotation of the engine.

The time intervals for the querying of the value $\phi(k)$ must be selected so that the time for the query of three angle values is not longer than the time from one discontinuity point to the next. If all three measurement values are within the monotonous range, then a clear conclusion can be drawn as to whether a reverse rotation is occurring. If the measurement points lie on both sides of a discontinuity point, then the reverse rotation is not detected at this time. The algorithm therefore assures that during normal operation, a reverse rotation is not falsely detected at the discontinuity point. In order not to be forced to choose a scanning time that is extremely short, it is a good idea to execute the reverse rotation detection only under a particular speed threshold.

At extremely low speeds, in order to avoid false detection of a reverse rotation based on the fixed time raster, a check must also be run as to whether there is a particular minimum angle between the scan times. This can take place by means of the following algorithm: $/\phi(k)-\phi(k-2)/>\epsilon$, where $\epsilon$ is a minimum angle.

Reference Numeral List

1 control unit
2 detector disk
3 crankshaft
4 angle marks
5 reference mark
6 sensor
7 camshaft
8 absolute angle detector
9 sensor
10 ignition lock switch
11 central processor unit
12 memory
13 output
14 output
15 battery
16 switch

What is claimed is:

1. A device for detecting the reverse rotation of a rotating part of an internal combustion engine, comprising a crankshaft (3), a sensor (6), and a detector disk (2), wherein said detector disk (2) is connected to the crankshaft (3) and has a reference mark (5) and a multitude of similar angle marks (4), wherein rotations of said crankshaft are sent by the sensor (6) to a control unit (1) in the form of pulses, further comprising a camshaft (7) and an absolute angle detector (8), wherein rotation of said camshaft (7) is detected by means of the absolute angle detector (8), wherein an output signal of the absolute angle detector (8) within a period of 360° of camshaft rotation or 720° of crankshaft rotation steadily falls with reverse rotation, $\phi(k)<\phi(k-1)<\phi(k-2)$, depending on the rotation direction, and wherein the output signal of the absolute angle detector (8) is supplied to the control unit (1) for processing, wherein in order to detect reverse rotations of the internal combustion engine, three successive angle values $\phi(k)$, $\phi(k-1)$, $\phi(k-2)$ are scanned from the output signal of the absolute angle detector (8) and are compared to one another in an algorithm in such a way that in the event of inverse operation with reverse rotations, the equation $\phi(k)<\phi(k-1)<\phi(k-2)$ is true, and wherein when this condition is not fulfilled, no conclusion is drawn regarding reverse rotations.

2. The device according to claim 1, characterized in that the scanned angle values $\phi(k)$, $\phi(k-1)$, $\phi(k-2)$ are fed into a shift register of the central processor unit (CPU) of the control unit (1), with the minimum depth of three values, and are compared to one another in the arithmetic-logic unit (ALU) according to the algorithm $\phi(k)<\phi(k-1)<\phi(k-2)$.

3. The device according to claim 1, characterized in that at low speeds, for the detection of reverse rotation, a check is run by means of another algorithm as to whether there is a minimum angle between the scanning times, wherein the algorithm reads:

$/\phi(k)-\phi(k-2)/>\epsilon$, where $\epsilon$ is a minimum angle.

4. The device according to claim 1 or 2, characterized in that the scan intervals are of equal length.

5. The device according to claims 1 to 4, characterized in that the time intervals for the scanning of the angle values $\phi(k)$ are chosen so that the time for the scanning of three successive angle values is not longer than the time from one discontinuity point to the next.

6. The device according to claims 1 to 5, characterized in that upon detection of reverse rotations in the control unit, the triggering of injection and ignition is suspended for a definite time.

7. A device for detecting the reverse rotation of a rotating part of an internal combustion engine, comprising a crankshaft (3), a sensor (6), and a detector disk (2), wherein said detector disk (2) is connected to the crankshaft (3) and has a reference mark (5) and a multitude of similar angle marks (4), wherein rotations of said crankshaft are sent by the sensor (6) to a control unit (1) in the form of pulses, further comprising a camshaft (7) and an absolute angle detector (8), wherein rotation of said camshaft (7) is detected by means of the absolute angle detector (8), wherein, in normal forward rotation, a steadily falling output signal is produced by the absolute angle detector, and wherein the output signal of the absolute angle detector (8) within a period of 360° of camshaft rotation or 720° of crankshaft rotation steadily rises with reverse rotation, $\phi(k)>\phi(k-1)>\phi(k-2)$, depending on the rotation direction, and wherein the output signal of the absolute angle detector (8) is supplied to the control unit (1) for processing, wherein in order to detect reverse rotations of the internal combustion engine, three successive angle values $\phi(k)$, $\phi(k-1)$, $\phi(k-2)$ are scanned from the output signal of the absolute angle detector (8) and are compared to one another in an algorithm in such a way that in the event of inverse operation with reverse rotations, the equation $\phi(k)>\phi(k-1)>\phi(k-2)$, is true, and wherein when this condition is not fulfilled, no conclusion is drawn regarding reverse rotations.

* * * * *